(12) United States Patent
Martin

(10) Patent No.: US 10,037,685 B2
(45) Date of Patent: *Jul. 31, 2018

(54) CONNECTED GATEWAY FOR SWITCHING POWER SOURCES

(71) Applicant: INTWINE CONNECT, LLC, Chagrin Falls, OH (US)

(72) Inventor: David Martin, Chagrin Falls, OH (US)

(73) Assignee: INTWINE CONNECT, LLC, Chagrin Falls, OH (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/160,021

(22) Filed: May 20, 2016

(65) Prior Publication Data

US 2016/0267776 A1 Sep. 15, 2016

Related U.S. Application Data

(62) Division of application No. 14/147,248, filed on Jan. 3, 2014, now Pat. No. 9,373,243.

(51) Int. Cl.

| | |
|---|---|
| *G08B 21/00* | (2006.01) |
| *G08B 29/18* | (2006.01) |
| *G08B 21/18* | (2006.01) |
| *G08B 5/36* | (2006.01) |
| *G08B 29/24* | (2006.01) |
| *H04L 12/66* | (2006.01) |
| *H04L 29/06* | (2006.01) |
| *H04W 24/04* | (2009.01) |
| *H04W 72/04* | (2009.01) |
| *G08B 21/12* | (2006.01) |
| *H04W 88/16* | (2009.01) |

(52) U.S. Cl.
CPC ............ *G08B 29/181* (2013.01); *G08B 5/36* (2013.01); *G08B 21/182* (2013.01); *G08B 29/24* (2013.01); *H04L 12/66* (2013.01); *H04L 69/08* (2013.01); *H04L 69/18* (2013.01); *H04W 24/04* (2013.01); *H04W 72/0413* (2013.01); *H04W 72/0453* (2013.01); *G08B 21/12* (2013.01); *H04W 88/16* (2013.01)

(58) Field of Classification Search
CPC ...................................................... G08B 21/182
USPC .................................. 340/627–630, 632–634
See application file for complete search history.

(56) References Cited

U.S. PATENT DOCUMENTS

| | | | |
|---|---|---|---|
| 4,146,803 A | 3/1979 | Kuwabara | |
| 2006/0261967 A1 | 11/2006 | Marman et al. | |
| 2011/0264276 A1* | 10/2011 | Kressner | .................. H02J 3/14 700/276 |

OTHER PUBLICATIONS

Non-Final Office Action for U.S. Appl. No. 14/147,248 dated Oct. 30, 2015, 9 pages.

* cited by examiner

*Primary Examiner* — Jeffery Hofsass

(74) *Attorney, Agent, or Firm* — Amin, Turocy & Watson LLP

(57) ABSTRACT

Systems, methods, and computer-readable media are presented herein for providing lower level physical-layer gateway functionalities and upper-level application functionalities; a system designed with flexible configurations in order to support a wide range of connected applications. The system includes a processor that executes machine instructions to perform operations. The operations comprise: receiving sensor data from a sensor device located in a building; converting the sensor data from a raw state to a physical measurement; and activating an abatement device situated in the building as a function of the physical measurement.

20 Claims, 7 Drawing Sheets

CONNECTED GATEWAY FOR SWITCHING POWER SOURCES

CROSS REFERENCE TO RELATED APPLICATIONS

This application is a Division of U.S. patent application Ser. No. 14/147,248, filed Jan. 3, 2014, the contents of which are hereby incorporated by reference.

TECHNICAL FIELD

The subject matter described and disclosed herein relates to networking products that provide lower level physical-layer functionality and upper-level application functionality.

BACKGROUND

Currently network devices such as gateways or protocol converters that convert transmission packets received in a first transmission protocol into one or more second transmission protocols for subsequent transmission, rebroadcast, or dispatch have generally not allowed for the definition and/or customization of applications operational and/or executing on the device. Moreover, the underlying operating systems underpinning operation of many of these devices have generally been proprietary and thus information as to the functional details of these operating systems has typically been inaccessible and/or unavailable to vendors and/or third parties. Additionally, current devices are constrained in that they are generally not adaptable and/or amenable to the incorporation of new and/or the constantly expanding functionalities and capabilities set forth in continually evolving technical standards promulgated by various networking and telecommunication standards bodies/groups, such as the 3$^{rd}$ generation partnership project (3GPP), the institute of electrical and electronics engineers (IEEE), and the like. Furthermore, current gateway devices and/or protocol converters are generally not modular devices and therefore do not allow for the internal installation of customized or customizable third party modules.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
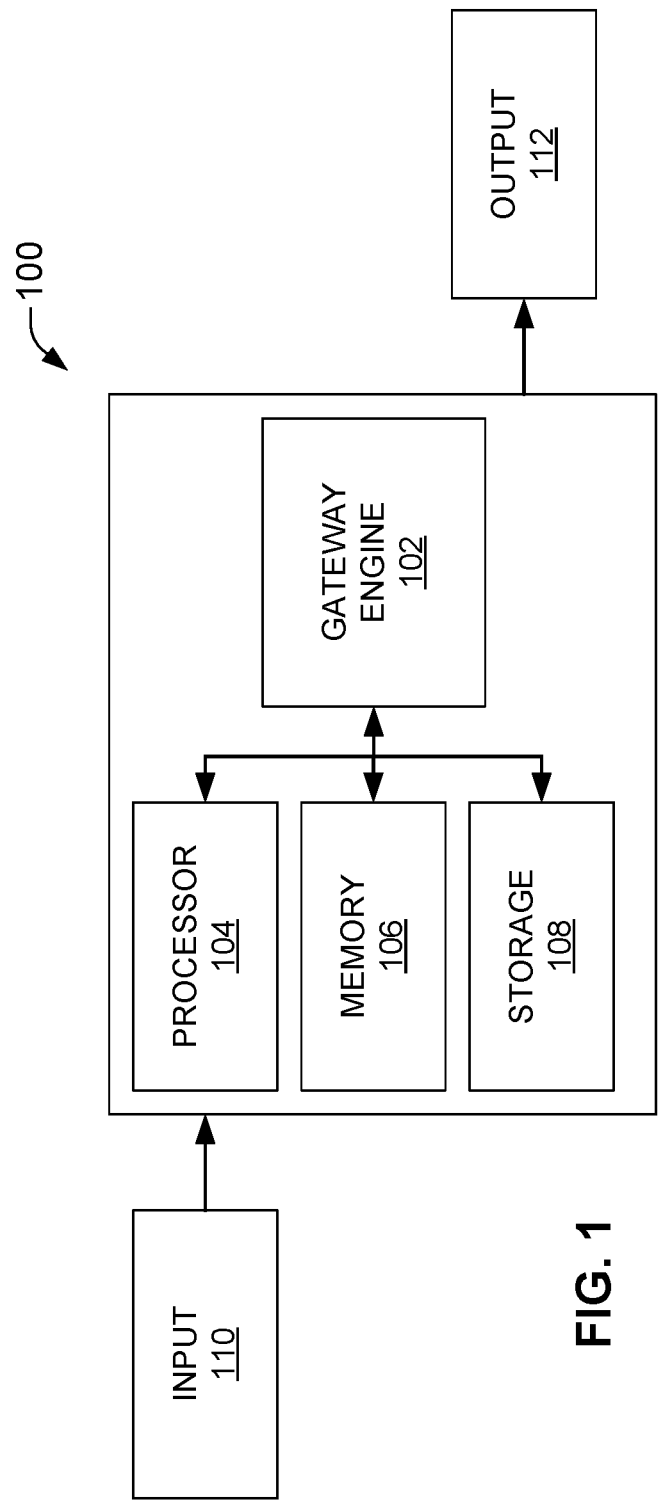
FIG. 1 illustrates a system for providing lower level physical-layer gateway functionalities and upper-level application functionalities in accordance with an aspect of the subject application.

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

The subject application describes and discloses a networking product, for instance a gateway and/or a protocol converter, which provides both lower level physical-layer gateway functionality as well as upper-level application functionality. The disclosed and described networking product is designed with flexible configurations in order to support a wide range of connected applications. The networking product provides extensive and reliable local connectivity through its Wi-Fi b/g/n radio with Bluetooth, ZigBee™ HA/SE radio, 10/100/1000 MB Ethernet local area network (LAN) and expansion module slot, which can support Z-wave radios, Sub-GHz radios, and a multitude of additional wired and wireless interfaces. The networking product also provides modularity in its wireless local area network (WLAN) uplink options through its optional 4$^{th}$ generation long term evolution (4G LTE) radio, Ethernet WAN and/or configuration in the Wi-Fi client mode. The networking product provides a customized/customizable open-source operating system (e.g., a Linux distribution) with board support and cross compiler tool chain. The build environment of the networking product allows users to add front end business software and develop applications directly on top of the customized/customizable open-source operating system. The described networking product therefore is a software and hardware platform upon which extensive machine to machine (M2M) applications can be executed in order to provide specific end-user functionality.

The described and disclosed networking product provides modularity in its wide area network (WAN) uplink options through cellular 4G LTE, wired Ethernet, and/or configuration in Wi-Fi client mode. The cellular interface also allows customers the ability to set up both a primary and secondary wireless access network ports. The wireless access network uplink allows users to export data in order to view usage and run applications remotely.

Additionally, the disclosed networking device is designed with flexible configurations in order to support a wide range of connected applications. The networking device provides extensive and reliable local connectivity through its standard Wi-Fi b/g/n radio with Bluetooth and optional ZigBee™ HA, Z-Wave, and Sub-GHz radios. The networking device also has standard Ethernet local access network (LAN), RS-485, or CAN Bus connectivity for wired LAN solutions.

The described networking device allows for the extraction, transformation, and loading of any existing data formats to local and/or remote databases and applications. This capability enables the networking device to support multiple protocols seamlessly integrate into existing systems.

The described and disclosed networking device provides an open architecture platform with an application-ready Java framework that allows for the rapid creation of custom applications. Additionally, the networking device includes a processor and ample internal memory to allow users to run applications directly on the device for local access and intelligence.

In accordance with various embodiments, the subject application presents a system, comprising: a memory to store instructions; and a processor, communicatively coupled to the memory, which facilitates execution of the instructions to perform operations. The operations can include receiving sensor data from a sensor device located in a building, wherein the sensor device measures a level of an airborne pollutant circulating in the building; converting the sensor data from a raw state to a physical measurement, by using a calibration equation to transform the sensor data from the raw state to the physical measurement; and activating an abatement device situated in the building as a function of the physical measurement. The sensor data can be subjected to a sampling process that compresses the sensor data to reduce a transmission time required to broadcast the sensor data.

Further operations can include broadcasting a notification message regarding the physical measurement in response to the physical measurement exceeding a defined threshold, actuating a controller to open a window or a door, broadcasting a notification message using a paging service, a email, a short message service, a multi messaging service, and activating an audible alarm or a visible alarm.

In accordance with yet further embodiments, the subject application describes a further system, comprising: a memory to store computer executable instructions; and a processor, communicatively coupled to the memory, which facilitates or effectuates execution of the computer executable instructions to perform operations. The operations can include receiving data from a home energy management system located in a habitable structure, wherein the home energy management system includes at least a thermostat, a controller, and/or an energy storage facility that includes a secondary power source; utilizing a conversion equation to convert the data from a raw state to a physical measurement; and switching, as a function of the physical measurement, supplied electrical power from a first power source to the secondary power source, wherein the secondary power source can be a solar panel associated with the habitable structure and/or a wind turbine associated with the habitable structure, for instance, and wherein the switching further comprises determining whether a physical measurement falls below a defined unit cost.

In accordance with still yet a further embodiment, the subject application describes a method, comprising: receiving raw data associated with a sensor device situated in a habitable structure; utilizing a conversion table associated with the sensor device to convert the raw data into a unit of measurement; and based on, or as a function of, the unit of measurement exceeding a defined set point, facilitating the actuation of a remediation device in a set of remediation devices that include a ventilator, an air conditioner, a humidifier, an extraction fan, a heater, a cooler, a chiller, or a blower, situated in the habitable structure to abate an airborne pollutant present in the habitable structure.

In accordance with the foregoing, the sensor device measures a level of an airborne contaminant circulating in the habitable structure, and the sensor data can be subjected to an intelligent sampling process that compresses the sensor data to reduce a transmission time required to transmit the sensor data.

The method can also include transmitting a notification message regarding the unit of measurement in response to the unit of measurement falling below a configurable set point, and actuating a controller to open a window or a door in order to remove airborne pollutants present in the habitable structure.

The following description and the annexed drawings set forth in detail certain illustrative aspects of the disclosed subject matter. These aspects are indicative, however, of but a few of the various ways in which the principles of the subject application can be employed. The disclosed subject matter is intended to include all such aspects and their equivalents. Other advantages and distinctive features of the disclosed subject matter will become apparent from the following detailed description of the various embodiments when considered in conjunction with the drawings.

Turning to the figures, FIG. 1 illustrates a system 100 that provides both lower level physical-layer gateway functionality and upper-level application functionality. System 100 is designed with flexible configurations in order to support a wide range of connected applications. System 100 provides extensive and reliable local connectivity through implementation of wireless technology standards for: exchanging data over short distances, using short-wavelength microwave transmissions in the industrial, scientific, and/or medical (ISM) radio bands [e.g., from 2400-2480 MHz] from fixed and/an mobile devices, creating personal area networks (PANs) with high levels of security (e.g., Wi-Fi b/g/n radio with Bluetooth); a suite of high level communication protocols utilized to create personal area networks built from small, low power digital radios typically based in an IEEE 802.15 standard (e.g., ZigBee™ HA/SE radio), 10/100/1000 MB Ethernet local area network (LAN), and one or more expansion module slots that can support wireless communications protocols designed for home automation to remotely control applications in residential and light commercial environments (e.g., Z-Wave radios, Sub-GHz radios, . . . ), and a multitude of additional wired and wireless interfaces. System 100 and can also provide modularity in its wireless local area network (WLAN) uplink options through its 4G LTE radio, Ethernet wide area network (WAN) and/or configuration in Wi-Fi client mode. System 100 provides a customized and/or customizable open-source operating system, such as a Linux operating system distribution, with board support and cross compiler tool chain. The build environment utilized by system 100 allows users to add front-end business software and/or develop applications directly on top of the customized and/or customizable open-source operating system. System 100, in accordance with an embodiment, can therefore be perceived as a software (e.g., software in execution) and/or hardware platform on which extensive machine to machine (M2M) applications can be executed in order to provide specific end-user functionalities.

In accordance with the foregoing therefor, system 100, as depicted, can include gateway engine 102 that can be coupled to processor 104, memory 106, and/or storage 108. As illustrated, gateway engine 102 can be in communication with processor 104 for facilitating operation of computer executable instructions and components by gateway engine 102, memory 106 for storing data and/or the computer executable instructions and components, and storage 108 for providing longer-term storage of data and/or computer executable instructions. Additionally, system 100 can also receive input 110 (e.g., packets received in a first transmission protocol language) for use, manipulation, and/or transformation by gateway engine 102 to produce one or more useful, concrete, and/or tangible result and/or transform one or article to different states or things (e.g., packets that were received in a first transmission protocol language are transformed into packets in a distinguishable second transmission protocol language). Further, system 100 can also generate and output the useful, concrete, and tangible result and/or the transformed one or more articles produced by gateway engine 102 as output 112 (e.g., the packet transformed in the second transmission protocol language).

Gateway engine 102, in accordance with an embodiment, allows users to define the applications that can execute on system 100. Additionally, system 100, and in particular gateway engine 102, employs at open-source operating system, albeit customized. The operating system operational and/or executing on system 100, and thus used by gateway engine 102 to facilitate its purposes, is a non-propriety operating system. System 100, and gateway engine 102, is more than a Wi-Fi to cellular gateway; it is an expandable/adaptable device that allows expanded functionalities and flexibility, providing functionalities and facilities greater the Ethernet, USB, and Wi-Fi.

System 100 in conjunction with facilities provided by gateway engine 102 provides a modularity to allow installation of customized/customizable modules (e.g., radio modules that can effectuate a modular connectivity standard that is based upon the connector type/protocol utilized to connect to system 100 and software in execution or being performed, transacted, executed, and/or enacted by a processor (e.g., processor 104). Such software in execution can include protocol messaging that can be transacted between a first connecting transmitter device (e.g., cellular device, smart phone, laptop computer, a server computer, desktop computer, personal digital assistant (PDA), mobile devices, handheld devices, portable and/or stationary industrial and/or consumer appliances, industrial automation devices, tablet computers, actuator, controller, and the like), system 100, and/or a second connecting device (e.g., receiving device) that can utilize system 100 as an intermediary to communicate, via system 100, with the first connecting device. The second connecting device (e.g., receiving device), as will be recognized by those of ordinary skill, can be a smart phone, cellular device, laptop computer, server computers, desktop computers, personal digital assistants (PDAs), mobile devices, handheld devices, portable and/or stationary industrial and/or consumer appliances, industrial automated devices, tablet computers, controller, actuator, etc.

A technology standard that provides the foregoing modularity is one promulgated by the universal smart network access port (USNAP) alliance; the standard enables any home area network (HAN) or demand response (DR) device, present and future, to communicate with utility systems, energy gateways, or other devices within a home or industrial environment, for example. The standard also provides a protocol independent modular communication interface (MCI) that permits device manufacturers to produce intelligent energy aware industrial and/or consumer appliances that are able to interact with each other as well as with, for example, electrical grid that utilizes information technology to gather and act on information, such as information about the behaviors of suppliers and consumers, in an automated fashion to improve the efficiency, reliability, economics, and sustainability of the production and distribution of electricity (e.g., a smart grid).

System 100 in collaboration with gateway engine 102, as noted earlier provides capabilities to include multiple interchangeable modular radio aspects, such as Ethernet, Wi-Fi, 4G LTE, ZigBee™, Bluetooth, etc. System 100 can have a customizable expansion radio capability, wherein interchangeable modular radio aspects can be incorporated within the corpus of system 100—through expansion slots. It should be noted, without limitation or loss of generality, that modules are not typically external to system 100, though as will be appreciated by those of ordinary skill, system 100 is not necessarily so limited. In order to facilitate such interchangeable modularity, system 100 can include internal ports for connectivity of additional capabilities/facilities; system 100 does not require additional aspects to be connected via or through external physical ports such as RS-232, Ethernet, LAN, etc.

It should be appreciated that while the subject disclosure is described in terms of technologies and standards maintained by the USNAP Alliance, the subject disclosure is not so limited, as any modular connectivity standard that is based upon the connector type/protocol utilized to connect to system 100 and software in execution that can include protocol messaging transacted between a transmitter/transmitting device, system 100, and/or a receiver/receiving device, wherein the transmitter/transmitting device and the receiver/receiving device utilize system 100 as a communication intermediary device, can be utilized to equal effect and purpose, without departing from the spirit, intent, and/or scope of the foregoing description. Other applicable communication protocols that can be implemented with equal facility and purpose can include use of Bluetooth, ZigBee™, Wi-Fi, for instance. These diverse and/or disparate communication aspects can be implemented through modular components that can be added and/or removed from system 100.

In the context of the suite of high level communication protocols utilized to create personal area networks built from small, low power digital radios typically based in an IEEE 802.15 standard (e.g., ZigBee™), use of this protocol suite provides system 100 the ability to establish a mesh network of devices (e.g., devices similar to system 100). With such a mesh network of devices connectivity is possible where wired connectivity has not been established, such as in portions of buildings where cables have yet to be run and may never be run.

In an example application of the foregoing, system 100 can connect to smart meter devices (e.g., ZigBee™ SEP 1.X smart meter devices) that can enable electric utilities and/or end users to manage energy demand over an electric utility's advanced meter infrastructure (AMI) network. System 100, through aspects provided by gateway engine 102, thus has the ability to connect and authentic with a smart meter device using a key establishment procedure. System 100, has the ability to automatically rejoin or re-establish connection, at a network level, to a previously associated smart meter device after a power failure that occurs to system 100. Additionally, system 100 has the capability to rejoin at a network level to a previously associated smart meter device after a general power outage (e.g., after a natural disaster, such as earth quake, hurricane, brownout, etc.). System 100 is also capable of reestablishing connection with the smart meter device should the smart meter device, rather than system 100, be the subject to a power outage. Further, in order to provide interchangeability, system 100 is capable of being reconfigured and/or associated with a disparate smart meter device should the need arise and/or when the smart meter device becomes inoperable. System 100 also provides facilities that allow a smart meter device to decommission/ disallow (temporarily and/or permanently) system 100 from being able to access the smart meter device, as circumstances dictate. It should nevertheless be comprehended that reinstatement of access to the smart meter device can be mutually facilitated should system 100 be powered off for a definable duration of time (e.g., 5 minutes, 10 minutes, 30 minutes, 1 hour, 6 hours, 12 hours, 24 hours, etc.) Additionally, system 100 has the facilities to re-associate with the smart meter device when there is a general system wide power failure, and system 100 is but one of many similar devices attempting to re-establish connectivity with the smart meter device.

System 100, using functionalities provided by gateway engine 102, can employ the smart meter device as a time server or time service (e.g., where the smart meter device sets the time) and system 100 can synchronize with the time signal propagated by the smart meter device. In accordance with this aspect, system 100 is also capable of automatically re-synchronizing with the smart meter device should the smart meter device undergo a soft reset; where system 100 itself experiences a connectivity failure (e.g., due to a power outage, having been disallowed connection by the smart meter device, communication failure, etc.); or where the smart meter device and system 100 both are subject to a general power outage and/or a communications failure.

In the context of metering, system 100 can support and/or display summation information recorded by the smart meter device using the formatting information from smart meter device with at least 1 decimal place precision. System 100 also provides support and/or display of current energy demand or energy consumption using formatting information from the smart meter device with at least 1 decimal place precision. Additionally, system 100 provides support and/or display of historical energy consumption, wherein the historical energy consumption uses the formatting information from the smart meter device with at least 1 decimal place of precision. It should be noted that in the context of measuring units, system 100 does not have the usage value for this attribute hardcoded; the measuring units are configurable depending on usage case. System 100 can also support and/or display consumption information according to the smart meter's configuration. Further, system 100 uses the attribute from the smart meter to apply a correct divisor for energy usage as well as use the attribute from the smart meter to apply the correct multiplier for energy usage.

In the context of frequency agility, system 100 is capable of changing to different wireless frequency channels as indicated by the smart meter device and after changing frequency channels is able to resume operations without errors. Additionally, system 100 is capable of changing to any channel in a specified spectrum while establishing communication with a smart meter device.

Moreover, system 100, in addition to being able to connect to smart meter devices to deliver demand management services, system 100 can also connect to a grid of similar devices and utility demand management internet protocol based servers via a broadband network through technical standards and protocols promulgated by the Open Automated Demand Response (OpenADR) alliance. System 100 therefore in able to simultaneously connect to electric utilities both through the smart meter device as well as through the Internet (e.g., using protocols provided by the Open Automated Demand (OpenADR) alliance). This facility provides utilities (e.g., electric, water, gas, etc.), homeowners, and residential and/or commercial building owners unmatched flexibility in network architecture.

Typically, system 100 can comprise or be associated with an uninterrupted power supply, as such when system 100 is situated between a router (e.g., home router) aspect and a wider local area network (LAN), system 100 can sense power outages and can configure and/or reconfigure itself to perform the additional facilities and/or functionalities generally provided by the router aspect. The configuration or reconfiguration of system 100 to perform the additional functionalities and facilities of the router aspect can be based on, or performed as a function of, a detection of a rapid diminution/cessation of a flow of data traversing through system 100 and/or a detection of a cessation or a fluctuation of input power to system 100 itself. It should be noted in this regard that various set points and/or thresholds (absolute and/or variable) can be employed in determining whether or not a flow of data has diminished with sufficient rapidity and/or whether or not power to system 100 has fluctuated sufficiently to warrant configuration of system to undertake the added responsibilities and functionalities of the router aspect.

On initial setup and/or configuration, system 100 can, for example, download, from a cloud storage service, a customized and/or a customizable operating system. As has been noted above, the customized and/or customizable operating system can be a distribution of an open source operating system, such as a customized distribution of Linux. The download from the cloud from the cloud storage service can be performed on a push and/or a pull basis, wherein on a push basis, a cloud storage service detects that system 100 has connected, via a local area network, to the cloud in general and that an appropriate distribution should automatically be forwarded to system 100. Conversely, where the customized and/or customizable operating system is to be disseminated from the cloud storage service to system 100 on a pull basis, system 100 can request that the customized and/or customizable operating system be downloaded from the cloud storage service. In this manner, regardless of whether the open source operating system is downloaded from the cloud storage service on a push and/or retrieved from the cloud storage service a pull basis, system 100 can download an operating system that can be automatically and uniquely configured and/or adapted as a function of one or more modules that can have been included within system 100 at the point in time when system 100 connects to the cloud via a local area network. It should be noted in regard to downloading of the customized and/or customizable operating system that the operating system distribution can be downloaded to system 100 in response to a user prompt (e.g., where a user utilizes a dialog with a cloud storage service to download an appropriate operating system distribution).

In the context of the foregoing operating system, it should be noted that system 100 can be booted from a secure digital (SD) memory card. This feature enables system 100 to be shipped to other equipment manufacturers in an "un-configured" state and provides the other equipment manufacturers the ability to configure and/or customize system 100 to their own specifications, thereby allowing these manufacturers the ability to effectively protect their proprietary intellectual property.

In accordance with an embodiment, system 100 can be utilized in a network of air quality monitor devices, wherein the air quality monitor devices include a multitude of air quality sensors (e.g., particulate matter sensors, temperature sensors, relative humidity sensors, volatile organic compound sensors, nitrogen oxides sensors, carbon monoxide sensors, combustible/flammable gases sensors, carbon dioxide sensors, formaldehyde sensors, hydrogen sensors, oxygen and/or ozone sensors, ammonia sensors, chlorine sensors, hydrogen sulfide sensors, and the like), measuring devices (e.g., light meters, barometers, radon monitors, thermostats, and the like), controllers (e.g., based on, or as a function of, measurements received from one or more sensors and/or measuring devices, one or more absolute threshold or set point and/or one or more defined or dynamically determined variable threshold or set point with respect to the measurements, causing or initiating actuation of abatement devices such as: ventilators, air conditioners, humidifiers, extraction fans, heaters, coolers, chillers, blowers, and the like), and actuators (e.g., for actuating the abatement or mitigation devices to open and/or close windows and doors, extract air from enclosed spaces, . . . ).

Each of the networked air quality monitor devices can also include facilities to disseminate notifications via email, telephonically, using a short message service (SMS), a multi message service (MMS), a paging service, or the like, to notify appropriate persons of the deterioration of the air quality within (or external to) a enclosed area (e.g., a residential home, a clean room, etc.). Additionally and/or alternatively, the facilities and/or functionalities to disseminate, send, or dispatch notifications by email, telephonically, using short message services, multi message services, paging services, to notify relevant parties of the deterioration of the air quality within confined areas can also be performed by system 100, and in particular by gateway engine 102.

Further, air quality monitor devices can also include facilities to cause the activation of one or more audio/visual warning indicators that can be associated with the networked air quality monitor devices or the one or more audio/visual warning indicators can be activated by system 100 (e.g., gateway engine 102 acting as a analytical and/or communication coordination nexus). Typical audio/visual warning indicators that can be activated by the air quality monitor devices on their own volition (or at the behest of system 100 and in particular by gateway engine 102) can include alarms, such as horns, buzzers, etc. and flashing light emitting diodes (LEDs). These audio/visual warning indicators and/ or dispatched notifications provide a method of informing relevant parties within, or external to, a confined space or area that the air quality has deteriorated or is deteriorating to deleterious levels because of rising levels in one or more measured air pollutant and/or humidity and/or temperature within the confined space, and that action needs to be taken to either abate the hazard (e.g., by ventilating the confined space) or by moving to a safer zone (such as moving outdoors, or to a pre-established clean room where the air quality is less hazardous or is subject to more robust air quality abatement or mitigation measures).

As intimated above, the aforementioned air quality monitor devices can be networked with one another and/or can be communicatively coupled to system 100. The connecting communications technologies that can be utilized by the air quality monitor devices and/or system 100 to establish network communications between each other to form the network or grid can include utilization of: advanced metering infrastructure (AMI) technologies, Wi-Fi technologies, cellular broadcast standards (e.g., 3GPP and/or 4G LTE standards, IEEE protocols, etc.), FM radio, the Internet, paging services, power line carrier technologies, etc. Other technologies that can be utilized with equal facility and/or functionality to establish communication networks between the respective air quality monitor devices and/or system 100 can include, for instance, a suite of high level communication protocols utilized to create personal area networks built from small, low power digital radios (e.g., ZigBee™); wireless standards for exchanging data using short wave length microwave transmissions in the industrial, scientific, and medical (ISM) radio bands (e.g., from 2400-2480 MHz) from fixed and/or mobile devices, creating personal area networks with high levels of security (e.g., Bluetooth); and/or technologies that utilize message based protocols designed to be employed in vehicles such as: automobiles, buses, trains, industrial and/or agricultural vehicles, waterborne vessels, aircraft, etc. to allow microcontrollers and/or devices to communicate with each other within the vehicle without the necessity of a host computer (e.g., CAN Bus).

As has been noted above, system 100, and the functionality and/or facility provided or supplied by gateway engine 102, in accordance with an embodiment, is as a device that converts packets received in a first transmission protocol language to packets formatted in a second transmission protocol language. The transformation that therefore takes place, is that a first packet received from a first device formatted in a first transmission protocol is transformed and/or formatted into a second packet in a second transmission protocol that can be transmitted to a second device. A useful concrete and tangible result or a transformation of an article to a different state or thing is thus resultant; from a packet configured for transmission by a first device in a first transmission protocol and comprehensible to the first device to a packet configured for reception by a second device in a second transmission protocol, wherein the packet received in the second transmission protocol is comprehensible to the second device.

Additionally system 100, in collaboration with gateway engine 102, can also convert raw sensor data (e.g., data obtained and/or solicited from one or more sensor devices and/or one or more measurement devices included or associated with one or more air quality monitor device organized as a network of air quality monitor devices and/or a set of networked air quality monitor devices, wherein a set as utilized throughout this disclosure is a grouping of devices that includes at least one device and the grouping is not a null or empty set) to physical units. Accordingly, system 100 and gateway engine 102 in particular can obtain and/or retrieve (e.g., from a server aspect situated in a network cloud), store (in memory 106 and/or in storage 108), and utilize calibration equations, graphs, tables, or charts, or other calibration mappings to convert raw sensor data to a physical measurement. It should be noted at this junction that the sensors and measuring instrumentation utilized and/or included within the air quality monitor devices at issue typically generate signals (analog and/or digital) that require one or more calibration equations, tables, graphs, charts, or other mapping or conversion techniques to convert a raw signal received from an air quality monitor device to an intelligible or comprehensible physical measurement that can be utilized to determine, in conjunction with various absolute and/or predetermined, contemporaneously ascertained and/or defined set point or thresholds, whether the air quality within a contained area or space has or is deteriorating.

The physical measurements generated by system 100 through facilities provided, for instance, by gateway engine 102 and/or its associated components can thereafter be displayed, for instance in an application operating and/or operational on system 100; an application that can graph the physical measurements on an associated display device (e.g., monitor display device within a web browser, etc.). The display of physical measurements within an application operating and/or operational on system 100 and/or in a graphical application executing on system 100, such as a web browser, can be effectuated locally and/or remotely. The graphical display generated by system 100 and projected onto a display surface can display thresholds or set points. For example, if air quality readings exceed and/or fall below defined and/or predetermined thresholds or set points, system 100 (and gateway engine 102) can send alerts, alarms (audible and/or visible), notifications (e.g., via e-mail, text message, paging, etc.), activate extraction fans, actuate the opening/closing the windows/doors, actuate air conditioners, blowers, heaters, coolers etc. in order to mitigate the deterioration of the air quality.

It will be noted, without departing from the generality of this disclosure, that the foregoing is managed from a single device, e.g., system 100, and more particularly gateway engine 102. Nevertheless, the foregoing facilities and functionalities can also be managed remotely from another device accessing system 100. Accordingly, system 100, through use of gateway engine 102, has the ability to virtualize the physical measurements pertaining, in this instance, to air quality measurement data obtained from one or more air quality monitor devices, and thereby provide a remote monitoring capability that allows remote monitoring devices, based on and/or as a function of the physical measurements representative of the air quality measurement data (e.g., the raw data captured by sensors or measuring instrumentation associated with a network of air quality monitor devices that was directed to system 100 for transformation to physical measurement data), one or more defined, pre-determined, dynamically determined (e.g., contemporaneously determined through use of one or more artificial intelligence and/or machine learning techniques and/or technologies that can be included within an artificial intelligence component, such as neural networks, expert systems, Bayesian belief networks, support vector machines (SVMs), Hidden Markov Models (HMMs), fuzzy logic, data fusion, collaborative filtering, and the like) thresholds or set points, absolute and/or variable, to dispatch alerts/notifications, activate alarms, actuate or set in motion a chain of events that culminates in the abatement and/or mitigation of the deterioration in error quality. Such abatement and/or mitigation activities can include actuating extraction fans, ventilators, humidifiers, dehumidifiers, sump pumps, atomizers, heaters, coolers, air conditioners, blowers, air pumps, air enrichment units, etc.

In accordance with an embodiment, system 100 in conjunction with gateway engine 102 can be configured to be connected to the Internet through a wide area network (WAN) via wired Ethernet, such that should the wired wide area network connection fail or be severed for any reason, system 100 using facilities provided by gateway engine 102 can seamlessly "fail over" and switch connectivity to the Internet using a wireless or cellular network connectivity to ensure uninterrupted functionality to an end user, for example. Once wired wide area network connectivity is restored, system 100, once again through functionality provided by gateway engine 102, can "fall back" to being connected to the Ethernet via the wired wide area network connection. This feature enables end users to leverage the low cost of wired wide area networks while using wireless or cellular connectivity as a fail over as an assurance of connectivity.

In addition, system 100 in accordance with an embodiment can also include an onboard web server or web service wherein system 100 can be accessible and fully operational to any local browser and/or wireless/cellular device (e.g., smart phone device, handheld device, etc.) without the necessity of system 100 being connected via a wired wide area network.

System 100 in addition to the foregoing can also include a protocol stack that enables remote connectivity to a cloud service/server that provides remote network management facilities and/or functionalities, such as over the air software maintenance and/or upgrade capabilities, and the ability to download new applications over the air (e.g., wirelessly). In the context of the latter facility, if a homeowner purchases system 100 for the purposes of an "indoor air quality monitoring" application, the homeowner can subsequently go online and purchase a further application, such as a "home energy management" application that can be employed to dynamically switch between one or more energy suppliers (e.g., grid power supplier, solar energy power supplier, wind energy power supplier, etc.) as a function of a unit cost to the home owner of consuming power. The purchase of the further subsequent application can initiate a chain of events that can culminate in the download and execution of the application on system 100 with no further user intervention. In accordance with an aspect therefore, the foregoing protocol stack can also be employed by system 100, and gateway engine 102, to manage cellular connectivity usage to fit into most cost effective cellular rate packages, as well as to provide notification should any device connected to system 100 and/or should system 100 itself go offline for any reason.

System 100 in addition to being powered through mains power (AC/DC power) can additionally and/or alternatively be operational using power over Ethernet (POE). As will be appreciated by those of ordinary skill, operating via power over Ethernet eliminates the need for a mains power outlet being located near system 100.

In addition to the foregoing, system 100 can include an uninterrupted data supply (UDS) functionality that can be analogous to an uninterruptible power supply (UPS) feature. Typically, the uninterrupted data supply feature can broadcast to a Wi-Fi network to which system 100 has/had established connection through a primary router in cases of power outages and/or when there are sensed primary router failures. Further, the included uninterrupted data supply aspect can also be configured to provide high-priority devices operating crucial applications (e.g., email servers, application servers, etc.) the required bandwidth for continued operations, while concurrently blocking or limit lowering non-crucial low priority applications (e.g., Netflix, Youtube, and the like) from continued/continuous operation. The uninterrupted data supply features of system 100 can also be configured or programmed to shut off or terminate when data limits have been reached in order to avoid data plan overages. Moreover, as will be appreciated by those of ordinary skill, the uninterrupted data supply facilities associated with system 100 can typically be tied to ancillary power sources, such a battery power packs, these ancillary power sources can also be beneficially utilized to provide power to other associated devices crucial and/or necessary to maintain continued network connectivity during power outages.

Figure 2:
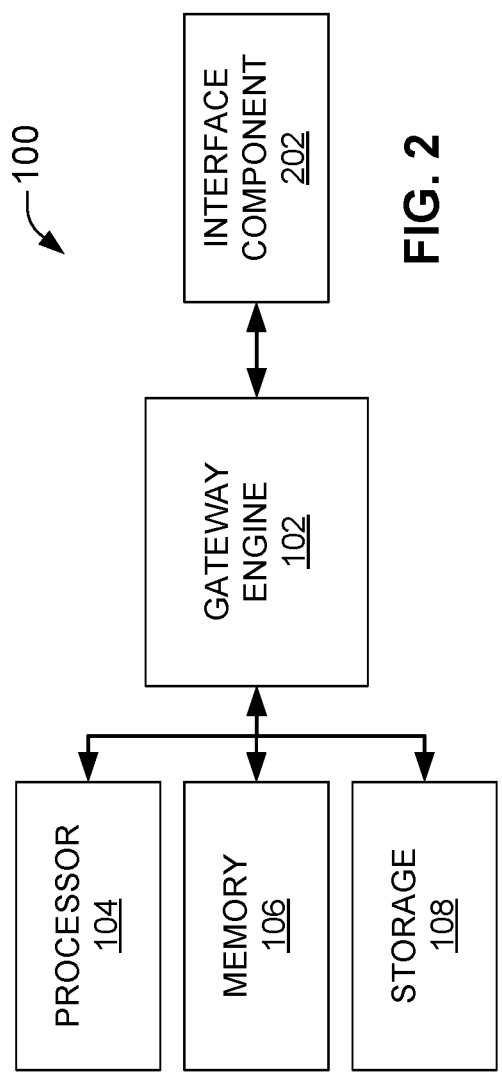
FIG. 2 provides a more detailed depiction of a system for providing lower level physical-layer gateway functionalities and upper-level application functionalities in accordance with ah aspect of the subject application.

FIG. 2 provides further illustration of system 100, wherein in addition to gateway engine 102, processor 104, memory 106, and storage 108, system 100 can also include interface component 202. Interface component 202 can be operational in collaboration with gateway engine 102 and can provide interface support (hardware and/or software) for various radio and networking interfaces, such as: interface support for technologies that allow electronic devices to exchange data or connect to the Internet wirelessly using radio waves, and that can be based on IEEE 802.11 standards (e.g., Wi-Fi, wireless access network (WAN), wireless local area network (WLAN), . . . ); and interfaces that enable system 100 to communicate, both wired and/or wirelessly, using the Ethernet; interfaces that permit system 100 to beneficially utilize the wireless and/or wired capabilities developed and promulgated by technical standards organizations, such as the $3^{rd}$ generation partnership project (3GPP). Interface component 202 can also provide interconnection and/or support for interfaces such as USB, ZigBee™ (HA or SE), Bluetooth, CAN Bus, and the like.

Figure 3:
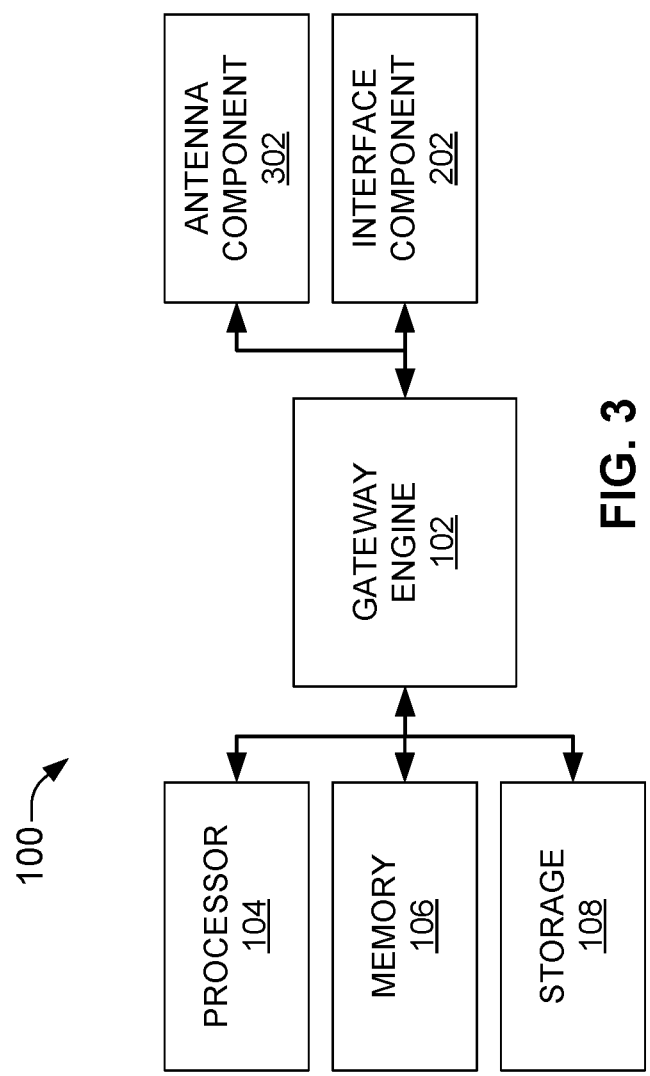
FIG. 3 provides a further illustration of a system for providing lower level physical-layer gateway functionalities and upper-level application functionalities in accordance with an aspect of the subject application.

FIG. 3 depicts further aspects of system 100, wherein in addition to gateway engine 102, processor 104, memory 106, storage 108, and interface component 202, system 100 can further include expansion component 302. Expansion component 302 provides support for non-standard wired and/or wireless interfaces. Expansion component 302 utilizes a form factor that supports a modular connectivity standard based on connector type and/or connector protocol. In accordance with an embodiment, expansion component 302 can utilize a form factor based on standards set forth by the universal smart network access port (USNAP) alliance. Expansion component 302 allows customized or customizable daughter cards to be created that can meet the communication needs of any network of end devices, such as air quality monitor devices, home/industrial energy management devices (e.g., devices, such as thermostats, water pump controllers, renewable resource energy generation [solar, wind, etc.] and storage facilities, etc. that when connected to system 100 permit utility resource management to be conducted from the central analytical nexus that is system 100), amongst others.

Figure 4:
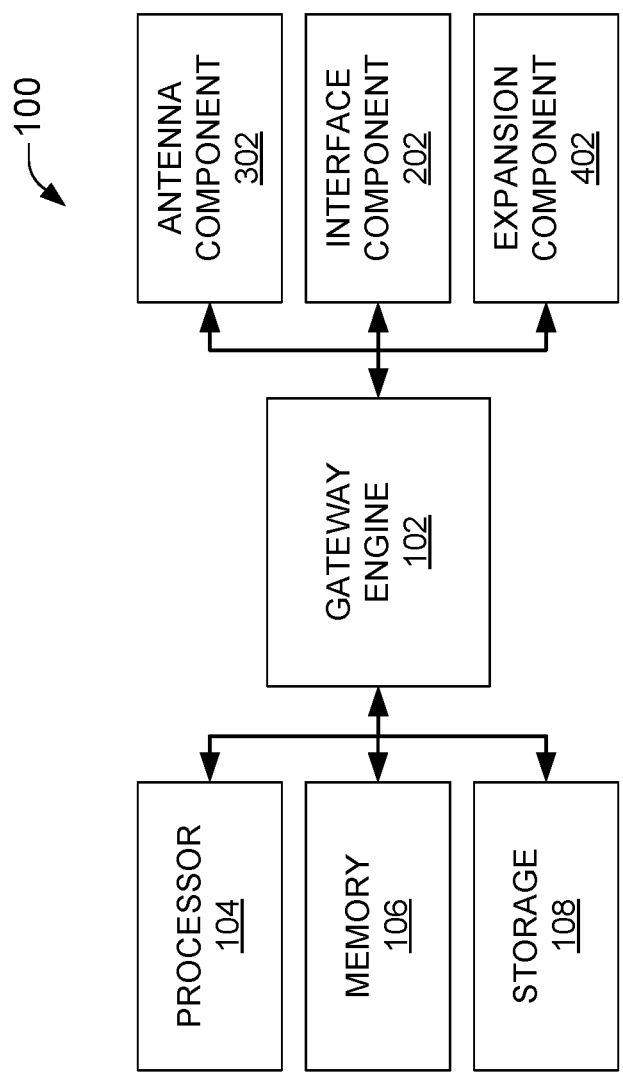
FIG. 4 provides another depiction of a system for providing lower level physical-layer gateway functionalities and upper-level application functionalities in accordance with an aspect of the subject application.

FIG. 4 illustrates further aspects of system 100, wherein system 100 can also include antenna component 402, in addition to gateway engine 102, processor 104, memory 106, storage unit 108, interface component 202, and expansion component 302. Antenna component 402 can be employed by system 100 to receive and/or transmit signals and data as necessary. Antenna component 402 can therefore include a receiver device that can receive signals from one or more disparate device (e.g., air quality monitor devices) through a plurality of receive antennas provided by a receive antenna array. The receiver device can receive information from the receive antenna and is operatively associated with a demodulator device that demodulates the received information. Demodulated symbols can be analyzed by a processor 104 that can be a processor dedicated to analyzing information received by the receiver device and/or generating information for transmission by a transmitter device, a processor that controls one or more components of systems 100, and/or a processor that both analyzes information received by the system 100, generates information for transmission by the transmitter device, and/or controls one or more components of systems 100, and which is coupled to memory 106 that stores data to be transmitted to or received from the one or more disparate devices, and/or any other suitable information related to performing the various actions and functions set forth herein.

Antenna component 402 can also include a transmitter device that transmits data to the one or disparate devices through a transmit antenna array. Typically, the transmitter device is coupled to a modulator device that can multiplex frames for transmission by the transmitter device via the transmit antenna array to the one or more disparate devices.

In the foregoing description, numerous specific details have been set forth to provide a thorough understanding of the embodiments. One skilled in the relevant art will have recognized, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to select appropriate relay stations for secondary transmitter and secondary receivers randomly situated within a cognitive radio network, wherein the secondary receiver and secondary transmitter can base their respective decisions as to which relay station is the most suitable relay station at least in part on links between the relay station and the secondary receiver and the secondary transmitter and the relay station.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Figure 5:
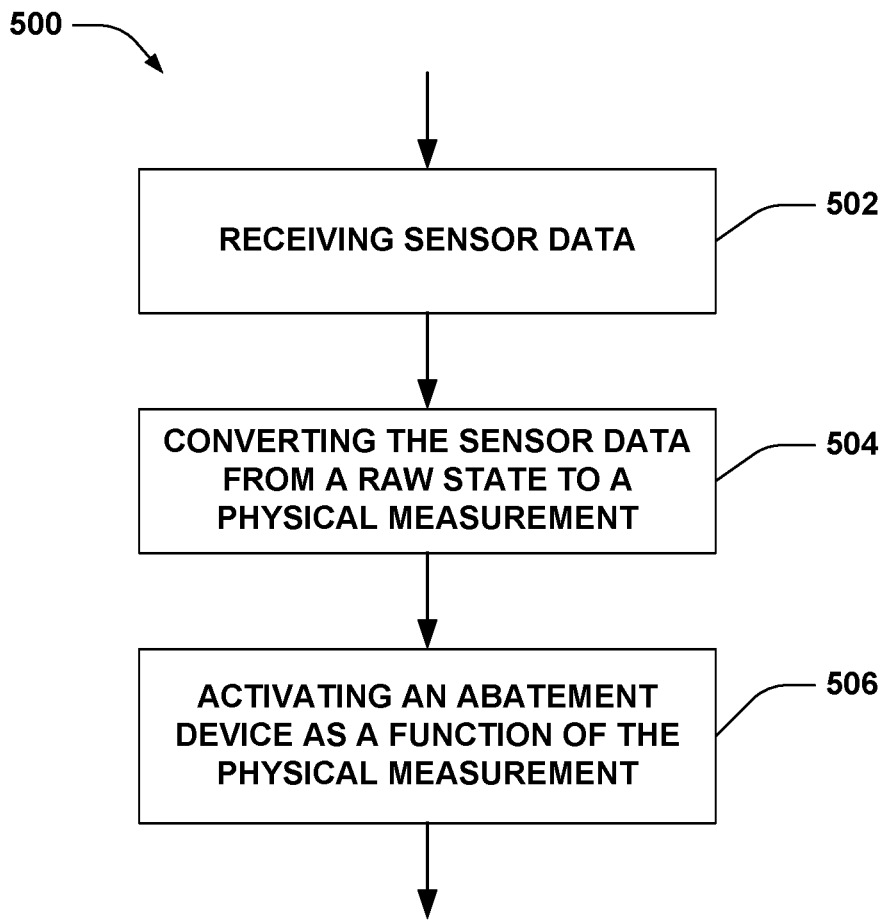
FIG. 5 illustrates a method for providing lower level physical-layer gateway functionalities and upper-level application functionalities.
Figure 6:
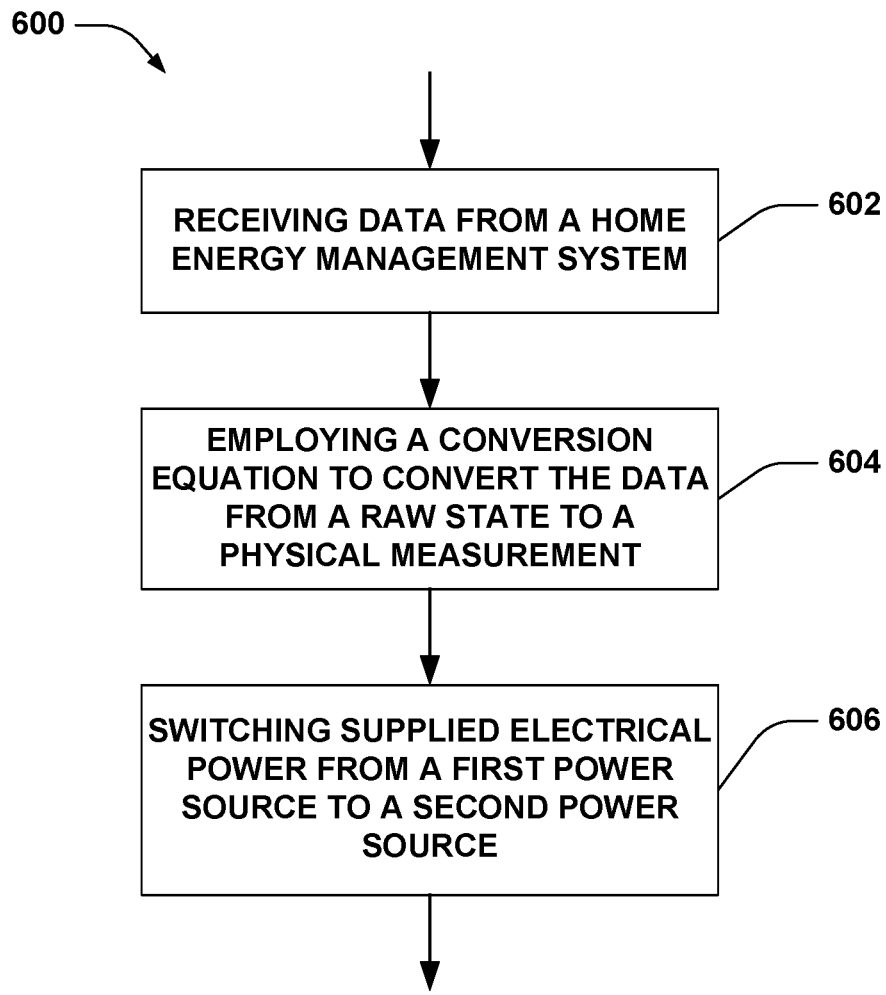
FIG. 6 illustrates a further method for providing lower level physical-layer gateway functionalities and upper-level application functionalities.

FIGS. 5-6 illustrate methodologies in accordance with the disclosed subject matter. For simplicity of explanation, the methodologies are depicted and described as a series of acts. It is to be understood and appreciated that the subject application is not limited by the acts illustrated and/or by the order of acts. For example, acts can occur in various orders and/or concurrently, and with other acts not presented or described herein. Furthermore, not all illustrated acts may be required to implement the methodology in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 5 provides an illustrative method 500 for providing lower level physical-layer gateway functionalities and upper-level application functionalities, in accordance with an embodiment. Method 500 can commence at 502 where sensor data can be received, wirelessly and/or through wire, from one or more sensors, such as sensors associated with air quality monitor devices located in a habitable building (e.g., residential building, apartment building, hospital, office, industrial building, etc.), or part thereof (e.g., bedroom, kitchen, dining room, office, clean room, operating room, datacenter, and the like). At 504 the received data can be subjected to a conversion process, wherein the received sensor data (e.g., raw data) is converted to a physical unit of measure using a conversion equation, conversion table, or conversion graph (wherein the conversion equations, conversion tables, and/or conversion graphs are related or pertain to one or more of the sensors associated with the air quality monitor devices, such as calibration curves that relate how to convert current sensor signals to units of measure, etc.). At 506 the physical units of measure can be utilized to activate an abatement device, such as an extraction fan, blower, ventilation system, and the like, in order to reduce the amount of contaminant detected by the sensors associated with the air quality monitor devices.

FIG. 6 provides a further illustrative method 600 for providing lower level physical-layer gateway functionalities and upper-level application functionalities, in accordance with an embodiment. Method 600 can commence at 602 where data from a home energy management system can be received. At 604 the received data can be converted from a raw state to a measurement unit using one or more conversion equation, wherein the conversion equation is a function of calibration specifications for one or more sensors included in the home energy management system. At 606 the supplied electrical power to a structure within which the home energy management system is located can be switched from a first power source (e.g., power emanating from the standard electrical grid—mains power) to an alternate power source, such as power generated, for example, by solar panel associated with the structure.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in storage systems described above, non-volatile memory 722 (see below), disk storage 724 (see below), and memory storage 746 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 7:
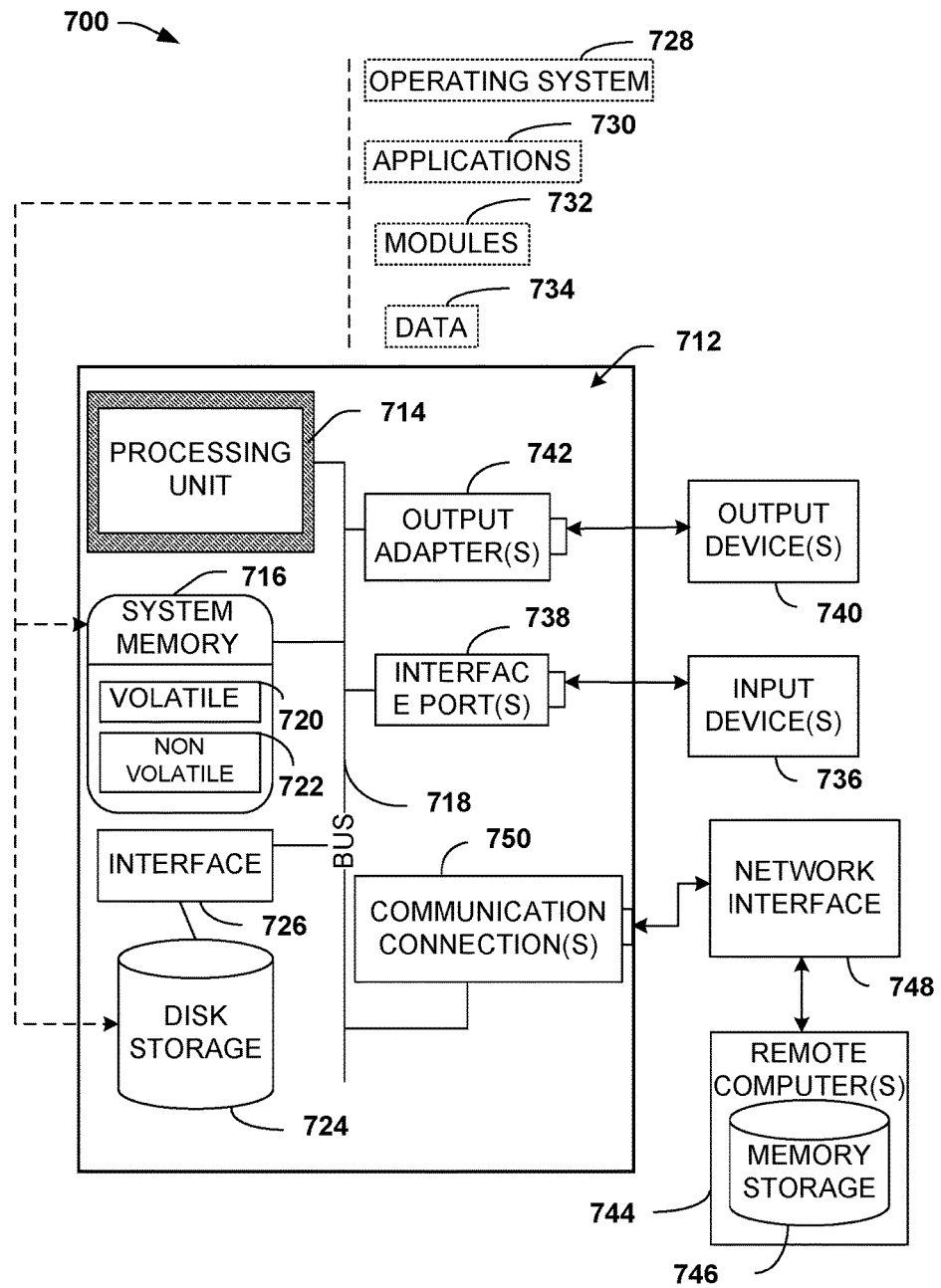
FIG. 7 illustrates a block diagram of a computing system operable to execute the disclosed systems and methods, in accordance with an embodiment.

In order to provide a context for the various aspects of the disclosed subject matter, FIG. 7, and the following discussion, are intended to provide a brief, general description of a suitable environment in which the various aspects of the disclosed subject matter can be implemented, e.g., various processes associated with FIGS. 1-14. While the subject matter has been described above in the general context of computer-executable instructions of a computer program that runs on a computer and/or computers, those skilled in the art will recognize that the subject application also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, handheld computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 7, a block diagram of a computing system 700 operable to execute the disclosed systems and methods is illustrated, in accordance with an embodiment. Computer 712 includes a processing unit 714, a system memory 716, and a system bus 718. System bus 718 couples system components including, but not limited to, system memory 716 to processing unit 714. Processing unit 714 can be any of various available processors. Dual microprocessors and other multiprocessor architectures also can be employed as processing unit 714.

System bus 718 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 716 includes volatile memory 720 and nonvolatile memory 722. A basic input/output system (BIOS), containing routines to transfer information between elements within computer 712, such as during start-up, can be stored in nonvolatile memory 722. By way of illustration, and not limitation, nonvolatile memory 722 can include ROM, PROM, EPROM, EEPROM, or flash memory. Volatile memory 720 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 712 can also include removable/non-removable, volatile/non-volatile computer storage media, networked attached storage (NAS), e.g., SAN storage, etc. FIG. 7 illustrates, for example, disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to system bus 718, a removable or non-removable interface is typically used, such as interface 726.

It is to be appreciated that FIG. 7 describes software that acts as an intermediary between users and computer resources described in suitable operating environment 700. Such software includes an operating system 728. Operating system 728, which can be stored on disk storage 724, acts to control and allocate resources of computer 712. System applications 730 take advantage of the management of resources by operating system 728 through program modules 732 and program data 734 stored either in system memory 716 or on disk storage 724. It is to be appreciated that the disclosed subject matter can be implemented with various operating systems or combinations of operating systems.

A user can enter commands or information into computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 714 through system bus 718 via interface port(s) 738. Interface port(s) 738 include, for example, a serial port, a parallel port, a game port, and a universal serial bus (USB). Output device(s) 740 use some of the same type of ports as input device(s) 736.

Thus, for example, a USB port can be used to provide input to computer 712 and to output information from computer 712 to an output device 740. Output adapter 742 is provided to illustrate that there are some output devices 740 like monitors, speakers, and printers, among other output devices 740, which use special adapters. Output adapters 742 include, by way of illustration and not limitation, video and sound cards that provide means of connection between output device 740 and system bus 718. It should be noted that other devices and/or systems of devices provide both input and output capabilities such as remote computer(s) 744.

Computer 712 can operate in a networked environment using logical connections to one or more remote computers, such as remote computer(s) 744. Remote computer(s) 744 can be a personal computer, a server, a router, a network PC, a workstation, a microprocessor based appliance, a peer device, or other common network node and the like, and typically includes many or all of the elements described relative to computer 712.

For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses wire and/or wireless communication networks such as local-area networks (LAN) and/or wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refer(s) to hardware/software employed to connect network interface 748 to bus 718. While communication connection 750 is shown for illustrative clarity inside computer 712, it can also be external to computer 712. The hardware/software for connection to network interface 748 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a memory to store computer executable instructions; and
   a processor, communicatively coupled to the memory, that facilitates or effectuates execution of the computer executable instructions to perform operations, comprising:
      receiving data from a home energy management system located in a habitable structure;
      utilizing a conversion equation to convert the data from a raw state to a physical measurement;
      switching, as a function of the physical measurement, supplied electrical power from a first power source to a second power source; and
      in response to receiving data representing a request to modify a network establishment technology employed to perform uplink transmissions from a first connection technology representative of a first wireless standard to a second connection technology representative of a second wireless standard, adjusting transmission parameters to use the second wireless standard.

2. The system of claim 1, wherein the second power source is a solar panel associated with the habitable structure.

3. The system of claim 1, wherein the second power source is a wind turbine associated with the habitable structure.

4. The system of claim 1, wherein the switching further comprises determining whether the physical measurement falls below a defined unit cost.

5. The system of claim 1, wherein the home energy management system includes a thermostat, a controller, or an energy storage facility that includes the second power source.

6. The system of claim 1, wherein the operations further comprise converting the data from the raw state to the physical measurement as a function of a calibration chart, a calibration table, or a calibration table.

7. The system of claim 1, wherein the data received from the home energy management system is compressed sensor data.

8. A method, comprising:
   obtaining data, by a system comprising a processor, from a home energy management system located in a habitable structure;
   converting the data, by the system, from a raw state to a physical measurement based on a conversion equation;
   based on the physical measurement, switching, by the system, supplied electrical power from a first power source to a second power source; and
   in response to receiving data representing a request to modify a network establishment technology employed to perform uplink transmissions from a first connection technology representative of a first wireless standard to a second connection technology representative of a second wireless standard, adjusting, by the system, transmission parameters to use the second wireless standard.

9. The method of claim 8, wherein the second power source is a solar panel associated with the habitable structure.

10. The method of claim 8, wherein the second power source is a wind turbine associated with the habitable structure.

11. The method of claim 8, further comprising determining whether the physical measurement falls below a defined unit cost.

12. The method of claim 8, wherein the home energy management system includes a thermostat, a controller, or an energy storage facility that includes the second power source.

13. The method of claim 8, further comprising converting the data, by the system, from the raw state to the physical measurement as a function of a calibration chart, a calibration table, or a calibration table.

14. The method of claim 8, wherein the data received from the home energy management system is compressed sensor data.

15. A non-transitory computer-readable storage medium comprising executable instructions that, when executed by a processor, facilitate performance of operations, comprising:
 converting data received from a home management system from a raw state to a physical measurement based on a conversion equation;
 in response to determining the physical measurement, switching supplied electrical power from a first power source to a second power source; and
 in response to receiving data representing a request to modify a network establishment technology employed to perform uplink transmissions from a first connection technology representative of a first wireless standard to a second connection technology representative of a second wireless standard, adjusting transmission parameters to use the second wireless standard.

16. The non-transitory computer-readable storage medium of claim 15, wherein the second power source is a solar panel associated with the habitable structure.

17. The non-transitory computer-readable storage medium of claim 15, wherein the first power source is a wind turbine associated with the habitable structure.

18. The non-transitory computer-readable storage medium of claim 15, wherein the operations further comprise determining whether the physical measurement falls below a set point representing a defined unit cost.

19. The non-transitory computer-readable storage medium of claim 15, further comprising converting the data from the raw state to the physical measurement as a function of a calibration chart, a calibration table, or a calibration table.

20. The non-transitory computer-readable storage medium of claim 15, wherein the data received from the home energy management system is compressed sensor data.

* * * * *